(12) United States Patent
Schmidt et al.

(10) Patent No.: US 10,345,896 B2
(45) Date of Patent: Jul. 9, 2019

(54) ALIGNMENT SENSOR SYSTEM AND ALIGNMENT SENSOR SYSTEM METHOD FOR A MOVEMENT INSTRUMENT

(71) Applicant: HYVE AG, Munich (DE)

(72) Inventors: Michael Schmidt, Wessling (DE); Johannes Scholl, Munich (DE)

(73) Assignee: ICAROS GMBH, Planegg (DE)

( * ) Notice: Subject to any disclaimer, the term of this patent is extended or adjusted under 35 U.S.C. 154(b) by 0 days.

(21) Appl. No.: 15/197,340

(22) Filed: Jun. 29, 2016

(65) Prior Publication Data

US 2017/0003739 A1 Jan. 5, 2017

(30) Foreign Application Priority Data

Jun. 30, 2015 (DE) .................. 10 2015 212 253

(51) Int. Cl.
| | |
|---|---|
| *G06F 3/01* | (2006.01) |
| *A63F 13/211* | (2014.01) |
| *A63F 13/90* | (2014.01) |
| *A63F 13/323* | (2014.01) |
| *G01C 19/5783* | (2012.01) |
| *G01C 21/08* | (2006.01) |
| *G06T 19/00* | (2011.01) |
| *G06T 19/20* | (2011.01) |
| *A63F 13/332* | (2014.01) |

(52) U.S. Cl.
CPC ............ *G06F 3/012* (2013.01); *A63F 13/211* (2014.09); *A63F 13/323* (2014.09); *A63F 13/90* (2014.09); *G01C 19/5783* (2013.01); *G01C 21/08* (2013.01); *G06T 19/006* (2013.01); *G06T 19/20* (2013.01); *A63F 13/332* (2014.09)

(58) Field of Classification Search
CPC ........ G06F 3/011; G06F 3/012; G06T 19/006; A63F 13/211; A63F 13/323; A63F 13/332
See application file for complete search history.

(56) References Cited

U.S. PATENT DOCUMENTS

| | | | |
|---|---|---|---|
| 2006/0211543 A1* | 9/2006 | Feldman ............ | A63B 22/0007 482/57 |
| 2009/0093305 A1* | 4/2009 | Okamoto ............ | A63F 13/10 463/36 |

(Continued)

FOREIGN PATENT DOCUMENTS

DE 10 2014 223 447 A1 5/2016

OTHER PUBLICATIONS

Moller et al. (NPL "Gymskill: A personal trainer for physical exercises.") Möller, Andreas, et al. "Gymskill: A personal trainer for physical exercises." Pervasive Computing and Communications (PerCom), 2012 IEEE International Conference on. IEEE, 2012.*

(Continued)

*Primary Examiner* — Diane M Wills
(74) *Attorney, Agent, or Firm* — Hassan Abbas Shakir; Shakir Law PLLC

(57) ABSTRACT

A system and a method detect alignment of a movement machine in a cost-effective manner. An alignment sensor system includes a movement instrument (1) for carrying out movements by displacing the center of gravity or actuating the muscles of a human body, with an alignment element, and a mass produced sensor, which is fixed relative to the alignment element.

7 Claims, 6 Drawing Sheets

(56) References Cited

U.S. PATENT DOCUMENTS

| | | | | |
|---|---|---|---|---|
| 2013/0208004 | A1* | 8/2013 | Hamada | G06T 19/006 345/633 |
| 2015/0294505 | A1* | 10/2015 | Atsmon | G06T 19/006 345/633 |

OTHER PUBLICATIONS

Video "Flying the Birdly Virtual Reality Simulator", URL: https://www.youtube.com/watch?v=gWLHIusLWOc, Date Posted: Sep. 2, 2014.*

Buttussi et al. (NPL "MOPET: A context-aware and user-adaptive wearable system for fitness training") Citation: Buttussi et al., "MOPET: A context-aware and user-adaptive wearable system for fitness training", HCI Lab, Department of Mathematics and Computer Science, University of Udine, Via delle Scienze 206, 33100 Udine, Italy, 2007.*

Article entitled "VR Workout Station Lets You Tone Your Abs While Traveling to Jupiter" retrieved Apr. 8, 2016 published at www.gizmodo.com/vr-workout-station-lets-you-tone-your-abs-while-traveli-1709502025 dated Jun. 6, 2015, cited in International Search Report (ISR) dated Apr. 18, 2016 of related application PCT/EP2016/052086.

De Angeli and Eamonn, "Development of an Inexpensive Augmented Reality (AR) Headset," in Human Factors in Computing Systems, ACM, 2, New York, Apr. 18, 2015, pp. 971-976, cited in International Search Report (ISR) dated Apr. 18, 2016 of related application PCT/EP2016/052086.

Office Action in related German patent application 10 2015 212 253.0 dated May 13, 2016 by the German Patent Office.

Office Action issued by the German Patent Office (DPMA) dated Feb. 5, 2018 in German, partial machine translation provided.

Website article "Icaros: Wir Haben Uns Auf Die Flugmaschine Gewagt [Video]" available at de.ubergizmo.com/2015/04/29/icaros-wir-haben-uns-auf-die-flugmaschine-gewagt-video.html, authored by Matthias Sternkopf, published Apr. 29, 2015, machine translation provided.

Video "Icaros—Der VR—Traum vom Fliegen mit Trainingseffekt ausprobiert" available at youtu.be/8AIrMi63e5I, upload date Apr. 29, 2015, uploaded/authored by Übergizmo DE, translation of screenshot text in German provided.

Website article "Virtual Reality Brillen: Der Große Vergleich", available at de.ubergizmo.com/2015/03/25/virtual-reality-brillen-der-grosse-vergleich.html, authored by Matthias Sternkopf, published Mar. 25, 2015, machine translation provided.

* cited by examiner

ALIGNMENT SENSOR SYSTEM AND ALIGNMENT SENSOR SYSTEM METHOD FOR A MOVEMENT INSTRUMENT

BACKGROUND OF THE INVENTION

1. Field of the Invention

The invention relates to an alignment sensor system and an alignment sensor system method for a movement instrument for carrying out movements by displacing the centre of gravity or actuating muscles of a human body.

2. Discussion of the Related Art

Training instruments for use in fitness studios, such as e.g. treadmills, steppers or bicycle ergometers, are known from sport instrument development. On these, a user sits or stands and carries out predetermined movements. In so doing, calories should be burnt, a training effect should be obtained and the user should have fun as a result of the physical activity.

Furthermore, games consoles such as the Nintendo Wii® or Sony PlayStation Move® are known, in which the user carries out physical movements which are detected by a sensor. In the former, control modules are guided in one or both hands, the position and alignment of which are determined by means of acceleration sensors in the control modules and by means of an optical detection of the control modules, and transmitted to the games console. In the latter case, the body or body parts are identified by means of a plurality of cameras, the position and alignment of the former being determined and transmitted to the games console. As a result of this, the progress of a game on a television screen can be influenced or controlled.

Furthermore, 3-D cinemas are known, in which films are shown with a three-dimensional effect so as to be able to offer to the observer a cinematic experience which is as close to reality as possible. As a result of a 3-D effect in the case of films, the action on the screen should appear more real and should let the cinema audience forget that they are at a cinema screening. In terms of experience, they should become part of the happenings where possible.

Moreover, simulators are known, in which a user controls e.g. a Formula One car or a racing motorbike, wherein the user is provided with a system made of computer monitors instead of a real windscreen. Furthermore, a driving experience that is closer to reality can be provided by virtue of the user taking a seat in an authentically reproduced vehicle cockpit and the operating elements differing only insignificantly from those of an actual vehicle.

Moreover, video glasses are known, which are arranged on, and fixed to, the head of a user ("head mounted display", referred to as HMD below), such as e.g. the Oculus Rift™ or HTC Vive™. On such video glasses, it is possible to visually output a virtual reality, with a user behaving during the use of such instrument as if he could look around in the virtual reality and move freely therein. If the user changes the alignment of his head, and hence of the video glasses as well, a sensor system arranged in stationary fashion establishes the change in alignment of head and glasses and forwards alignment change direction and speed to a computer unit, which accordingly calculates the video image displayed by means of the video glasses such that the impression that he could in fact look around freely or even move freely in the virtual space arises for a user.

Furthermore, flight simulators for pilot training are known; these, firstly, reproduce an authentic cockpit and, secondly, also simulate the actual movements and accelerations which act on a real cockpit during the flight, during take-off and during landing. By way of example, this is carried out by virtue of the cockpit being arranged on a movement platform, such as e.g. a tripod, or being gimbal-mounted in any other way, and the cockpit being able to be moved, tilted and accelerated in different directions by way of the movement platform.

The patent application DE 10 2014 223 447.8, which was not published at the filing date, has disclosed an instrument for carrying out movements by displacing the centre of gravity or actuating the muscles of a human body, wherein a user brings about a displacement of the centre of gravity by moving his hip region while the user is supported on the instrument, and he is able to tilt a movable part of the instrument, including his own body, in different directions. In the process, the user can wear video glasses at the same time and move and interact in virtual surroundings as a result of the overall system of video glasses and movement instrument. Here, the movements caused by the user can be generated only by gravity by means of displacing the centre of gravity. This movement instrument is an instrument which changes the alignment thereof passively by user interaction and which does not predetermine said change in alignment itself in a controlled manner.

In the case of combining such a movement instrument with an HMD it is possible, for example, to simulate a hang glider flight for the user, wherein a change in alignment of the movement machine caused by displacing the centre of gravity of the body is evaluated in order to control the simulated hang glider and, by way of the HMD, there is an image reproduction of the simulation which is adapted to the alignment of the head.

A problem here is that both the alignment of the movement machine and the alignment of the head need to be detected independently of one another in order to enable this, or a similar, simulation. Thus, the alignment of the head is ultimately composed of the sum of the alignment of the movement machine and the alignment of the head relative to the alignment of the movement machine. A detection of the absolute head alignment enabled by the HMD does not allow any conclusions to be drawn about the alignment of the movement machine and hence of the body of the user.

SUMMARY OF THE INVENTION

It is an object of the invention to provide a device and a method which enable the determination of the alignment of such a movement machine in a cost-effective manner.

By using a mass produced sensor, in particular a smartphone, to detect the position of an alignment element of a movement machine, a high quality alignment detection using cost-effective means is possible.

If a conventional computer is used to establish the alignment of a display unit, in particular video glasses, and to establish an image for the display unit, a high-performance system can be provided using cost-effective standard components.

If a further smartphone is used in place of the video glasses and the calculations for the display are carried out by this smartphone or the mass produced sensor, it is possible to reduce the complexity of the system and increase the user comfort.

BRIEF DESCRIPTION OF THE INVENTION

An exemplary embodiment of the invention is explained on the basis of the drawings attached below.

DETAILED DESCRIPTION OF THE INVENTION

Figure 1:
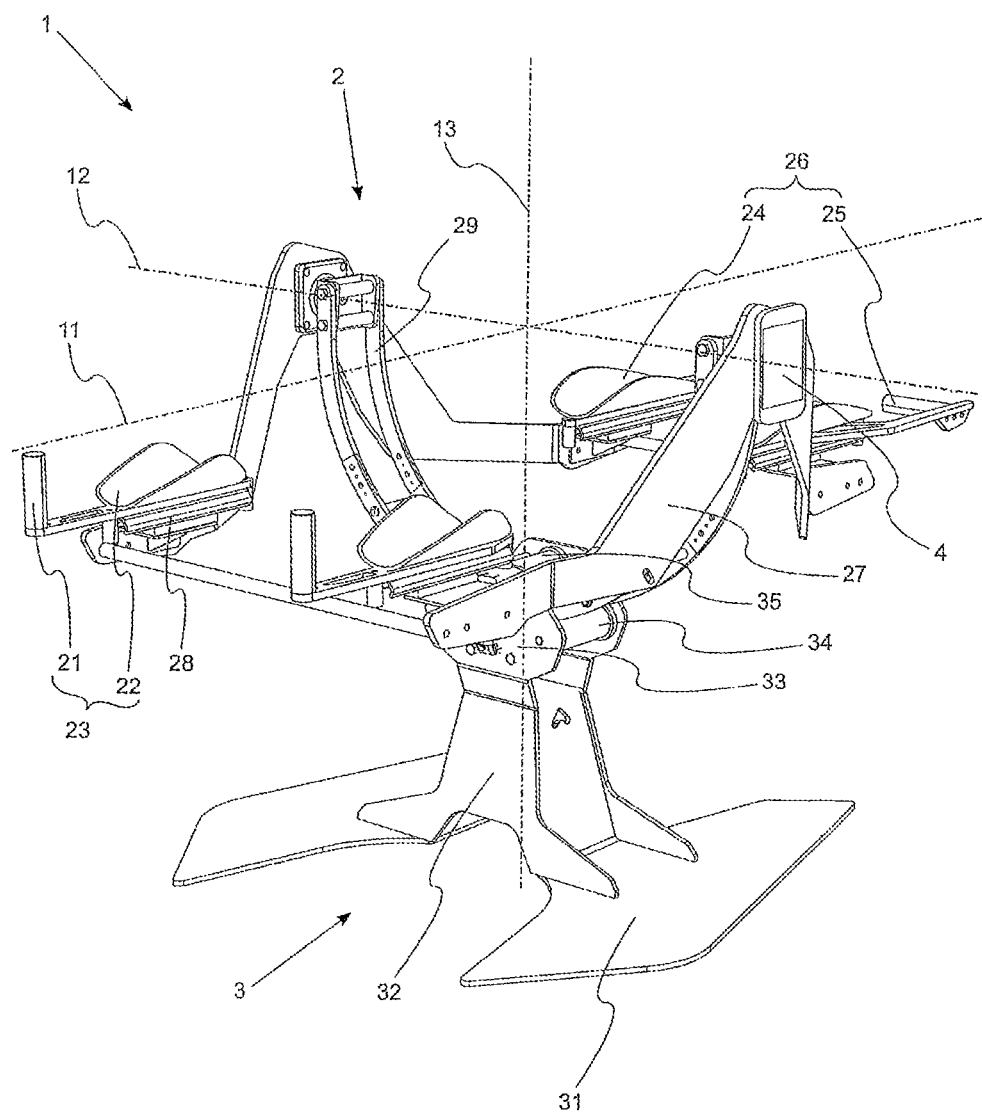
FIG. 1 shows an exemplary embodiment of the invention in a perspective view.

FIG. 1 shows a perspective view of a movement instrument 1. Movement instruments within the meaning of this patent are all instruments which enable movements of a human body to be carried out by displacing the centre of gravity or actuating the muscles of same. The movement instrument 1 has an alignment element 2 and a base element 3.

The alignment element 2 is rotatable about a horizontally extending longitudinal axis 11, about a transverse axis 12 extending horizontally and perpendicular to the longitudinal axis, and, optionally, about a vertical axis 13 which is vertical and therefore perpendicular to the two previous axes, about a point of rotation formed by the common point of intersection of the axes. In the exemplary embodiment, the vertical axis extends strictly vertically. However, the vertical axis can also be tilted forward or backward about the transverse axis 12.

The direction and position specifications "front", "back", "left" and "right" used below relate to the alignment of the movement instrument and emerge as follows: "front" describes the side of the movement instrument which lies at the left end of the longitudinal axis 11 in FIG. 1 and at the top end of same in FIG. 4; "back" describes the side of the movement instrument which lies at the right end of the longitudinal axis 11 in FIG. 1 and at the bottom end of same in FIG. 4; "right" describes the side of the movement instrument which lies at the left end of the transverse axis 12 in FIG. 1 and at the right end of same in FIG. 4; "left" describes the side of the movement instrument which lies at the right end of the longitudinal axis 11 in FIG. 1 and at the left end of same in FIG. 4.

The alignment element 2 has a support device 20 for a body of a user. The support device 20 has gripper elements 21, armrests 22 and leg rests 24. Arranged at the back end of the alignment element 2 are footrests 25, which allow a user to be supported by way of the soles of the feet. One gripper element 21 and one armrest 22 of one side are fixed in an immovable manner relative to one another in each case and form a gripper unit 23. One leg rest 24 and one footrest 25 of one side are fixed in an immovable manner relative to one another in each case and form a foot unit 26. The body of a user is supported on the movement instrument 1 by this support device 20.

The individual parts of the support device 20 are connected to a frame element 27. The gripper units 23 and the foot units 26 are connected to the frame element 27 via a rail element 28, as a result of which the gripper units 23 and the foot units 26 can be displaced in the longitudinal direction of the movement instrument 1 within predetermined boundaries. The individual elements of the support device 2 can be tilted together with the frame element 27 about the transverse axis of the instrument 1 about a bearing, by means of which the frame element 27 is connected to a further support element with a circular segment form—the arc element 29.

The whole movement instrument 1 rests on the floor by way of the base element 3. To this end, it has a baseplate 31 which, during operation, is mounted on a support, e.g. a floor, in a non-displaceable or non-rotatable manner. The base element 3 furthermore has a support column 32, which extends upward perpendicular to the baseplate 31. Arranged at the top end of the support column 32 is a bearing 33—a roller guide in the exemplary embodiment—by means of which the alignment element 2 is mounted in such a way that it can rotate the alignment thereof at least about the longitudinal axis 11 about a centre of rotation formed by the point of intersection of the axes. The roller guide 33 has an arc-shaped arrangement of two roller elements 34, on which the arc element 29 is mounted, wherein at least one roller 35 is additionally arranged above the arc element 29 in the vertical direction in order also to secure these components in a vertical direction.

A sensor unit is arranged on the frame element 27, level with the bearing connection to the arc element 29, in such a way that it is fixed in terms of the alignment thereof relative to the frame element 27. The sensor unit consists of a smartphone 4 which is described later in conjunction with FIG. 5.

In this embodiment, the vertical axis 13 of the instrument 1 is arranged vertically. However, it would also be conceivable for the vertical axis 13 to be tilted to the front or back. Furthermore, the longitudinal axis 11 extends horizontally in this embodiment. It would also be conceivable for the longitudinal axis 11 to be tilted downward or upward. In this exemplary embodiment, the transverse axis 12 is arranged fixed in relation to the frame element 27. If the frame element 27 is tilted about the longitudinal axis 11, the transverse axis 12 of the instrument also tilts accordingly. If the alignment element 2 has already been tilted about the longitudinal axis 11, there therefore is further tilting of the support device 20, together with the frame element 27, about the likewise tilted transverse axis 12.

The support element in circular segment form—the arc element 29—need not necessarily have an embodiment in circular segment form. In another embodiment, this support element can e.g. follow any curve function in terms of the form thereof. Furthermore, it would be conceivable to embody the arc element 29 not as a circular segment but as a closed circle. In such an embodiment, it could be possible for the user to carry out a complete rotation about the longitudinal axis using the instrument.

Figure 2:
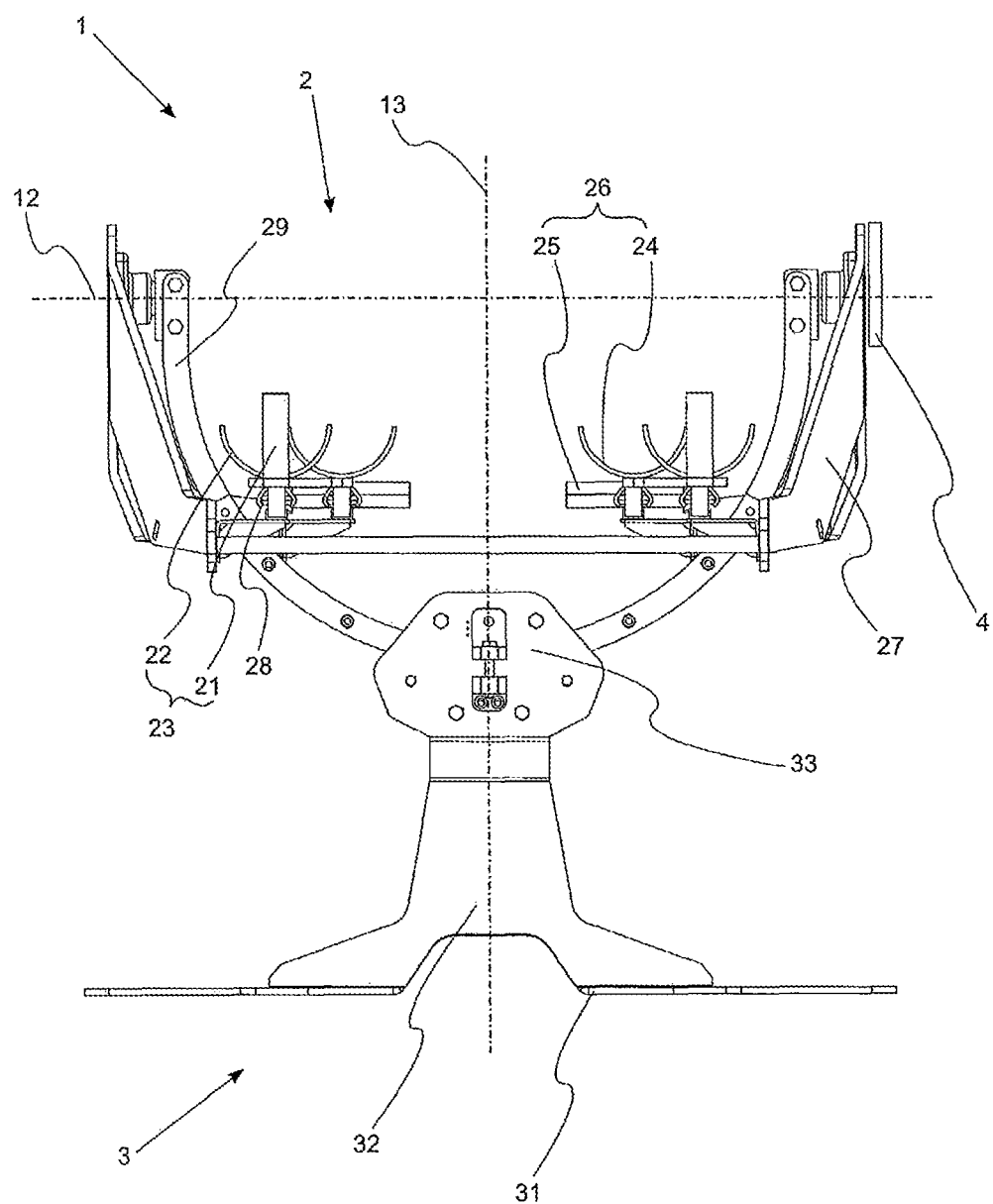
FIG. 2 shows an exemplary embodiment of the invention in a view from the front.

FIG. 2 shows the front view of a movement instrument 1 for carrying out movements by displacing the centre of gravity or actuating the muscles of a human body, wherein the vertical axis 13 of the instrument extends in the vertical direction and the transverse axis 12 of the instrument extends in the horizontal direction in relation to FIG. 2. In this view, it is readily identifiable that the frame element 27 has two parts, which are arranged on the right-hand and left-hand side of the image. The individual parts of the instrument 1 can be produced from different materials. By way of example, carbon fibre reinforced plastic, conventional plastic or metal. In a preferred embodiment, the entire structure of the instrument is embodied to be as light as possible. As a result of a low mass, in particular of the movable parts of the instrument, the operating comfort for the user can be increased since tilting can be brought about more easily.

Figure 3:
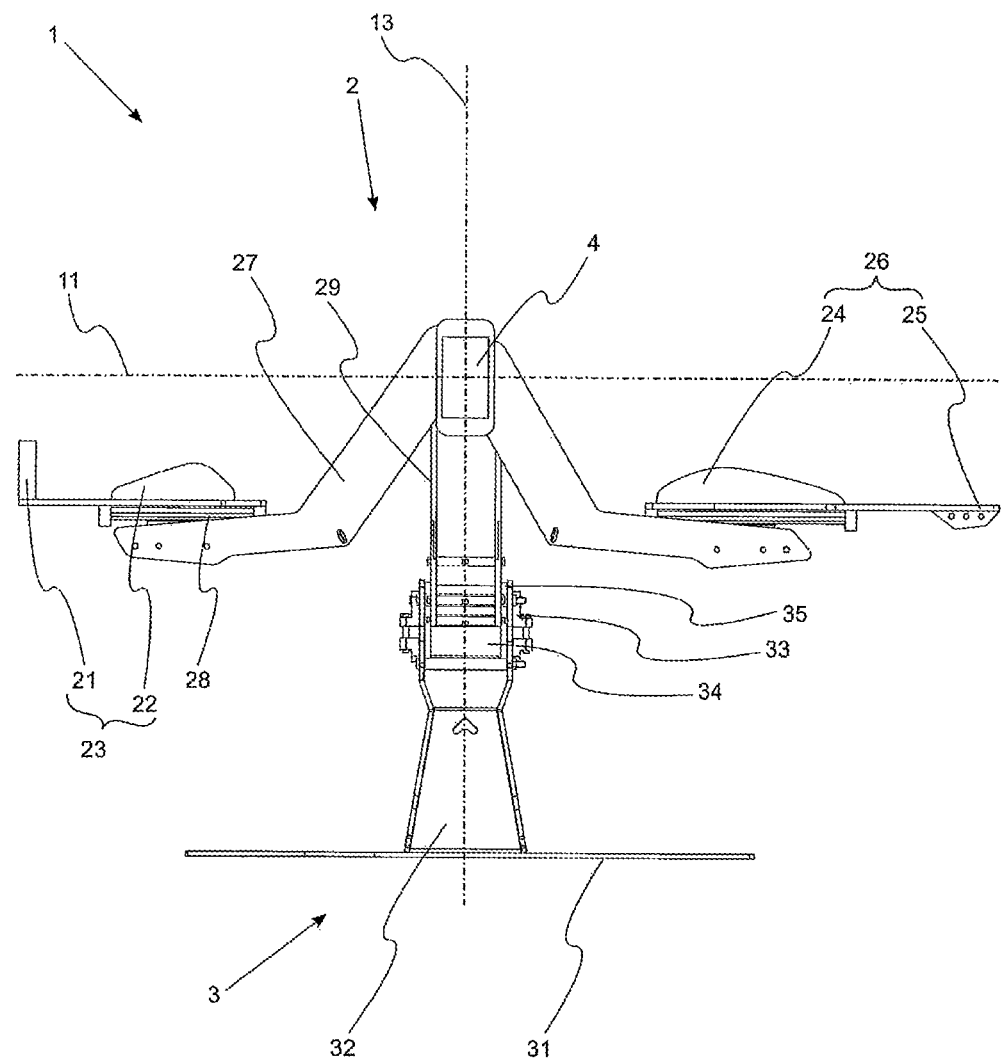
FIG. 3 shows an exemplary embodiment of the invention in a view from the left-hand side.

FIG. 3 shows a side view of the movement instrument 1, wherein, in relation to FIG. 3, the longitudinal axis 11 of the instrument extends in the horizontal direction and the vertical axis 13 extends in the vertical direction. If the frame element 27 tilts about the transverse axis 12 of the instrument, with the transverse axis 12 extending perpendicular to the plane of the drawing, i.e. if it emerges from the plane of the drawing, then the support device 20 likewise tilts about the transverse axis 12 of the instrument.

Figure 4:
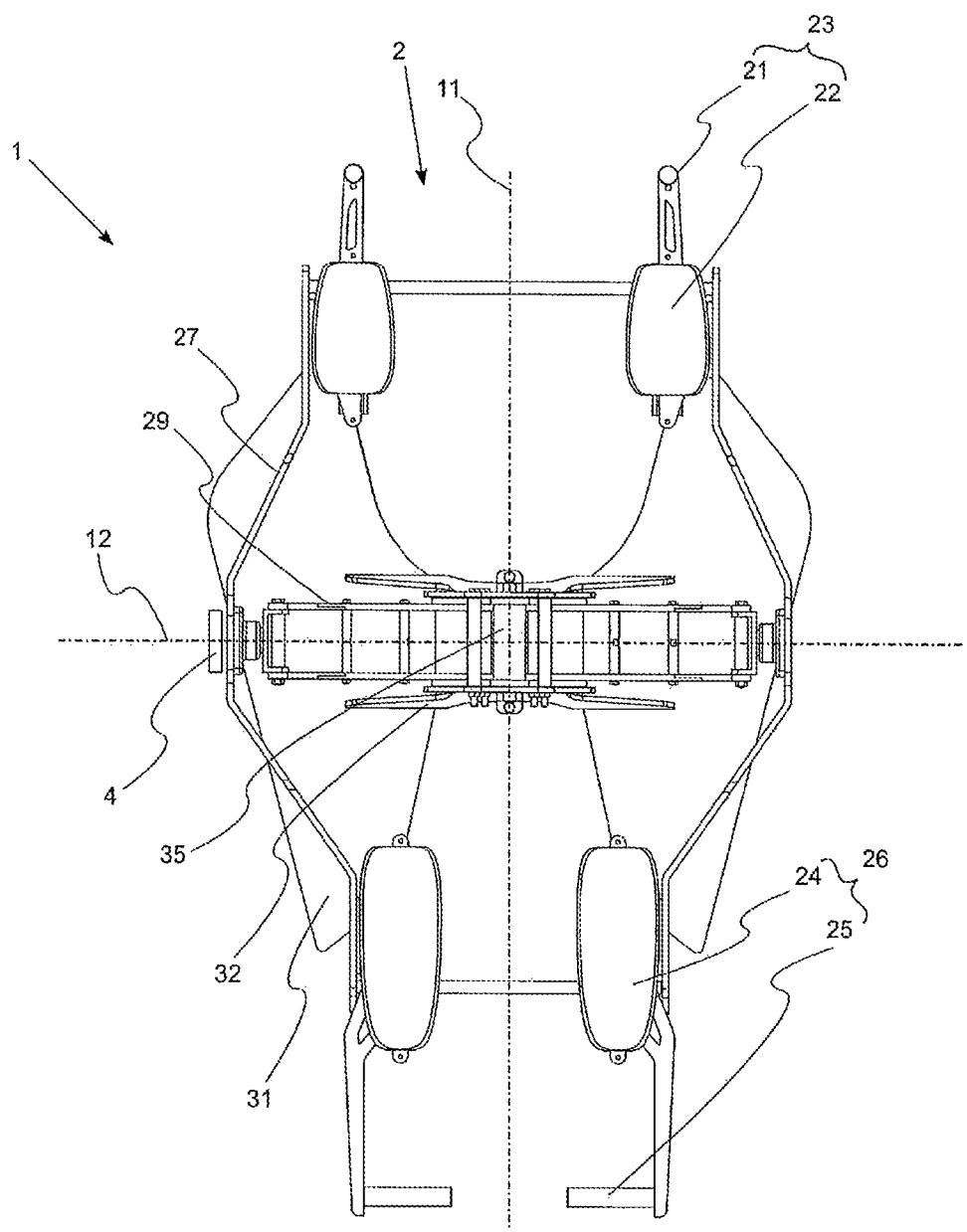
FIG. 4 shows an exemplary embodiment of the invention in a view from the top.

FIG. 4 shows a plan view of the movement instrument 1, wherein, in the FIG., the transverse axis 12 of the instrument extends horizontally and the longitudinal axis 11 of the instrument extends vertically in relation to FIG. 4, wherein the rear region of the movement instrument 1 is arranged on the lower side of the image, the front region of the movement instrument 1 is arranged on the upper side of the image, the right region of the movement instrument 1 is arranged at the right edge of the image and the left region of the movement instrument 1 is arranged at the left edge of the image. Furthermore, it is possible to identify the leg rests 24, the foot struts 25, the armrests 22 and the gripper elements 21.

Figure 5:
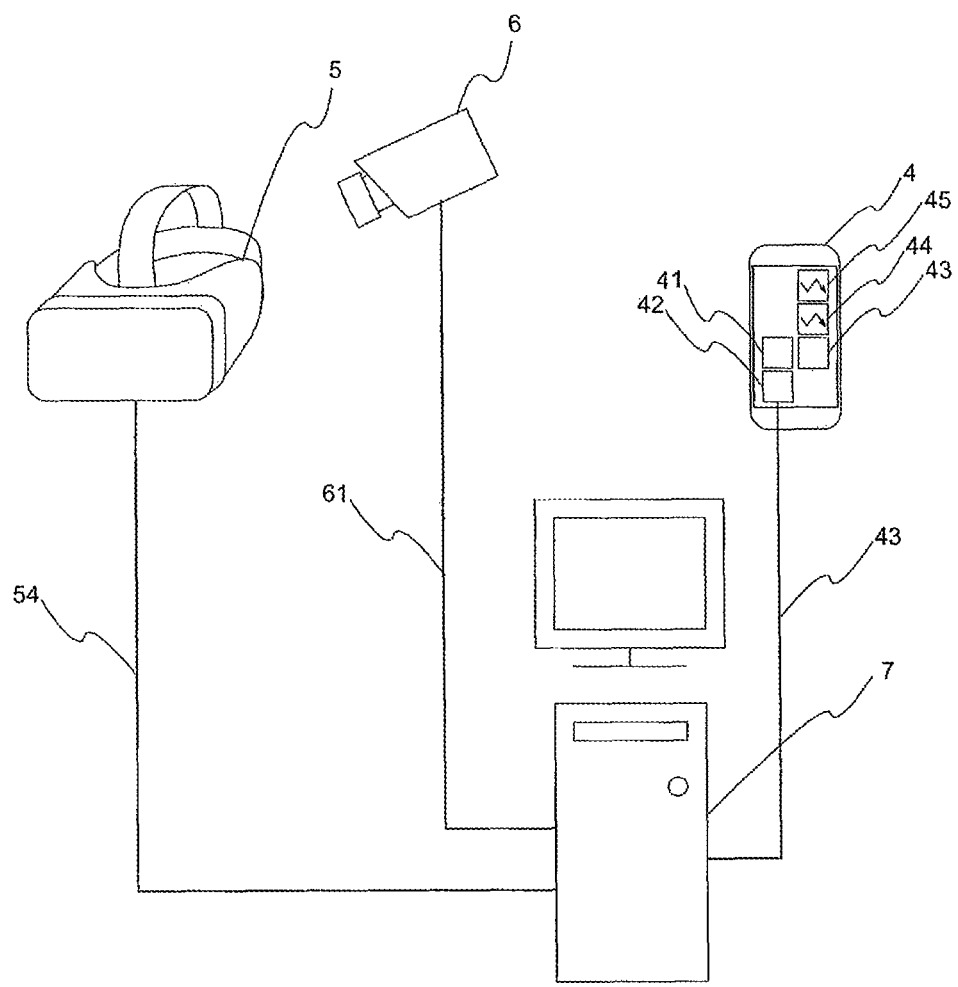
FIG. 5 shows a schematic illustration of the system according to the invention.

FIG. 5 shows the components of the system according to the invention. In addition to the movement instrument 1 described above, the system has the sensor unit 4. In the exemplary embodiment, the sensor unit is a smartphone. Alternatively, other mass produced portable electronic instruments with position sensors are usable as a sensor unit, e.g. a media player, for example an iPod™, a smartwatch, activity band or a handheld controller, in particular a handheld controller of a games console. The term mass produced sensor used below comprises these instruments and it is defined as portable electronic device with position or alignment sensors and data transmission capability, which was produced in mass production methods and which is directed to an end-consumer as buyer.

The smartphone 4 comprises a calculation unit 41, a transmission and reception unit 42—for communication by way of WLAN, Bluetooth™ or mobile radio in the exemplary embodiment—, a display unit 43, a three-axis gyro sensor 44 and an acceleration sensor 45.

The system furthermore comprises an HMD 5 ("head mounted display"), which can be arranged on and fixed to the head of a user. In the exemplary embodiment, this is an Oculus Rift™ device. The HMD 5 comprises a display 51, a three-axis gyro sensor 52 for detecting the alignment of the HMD 5, a magnetometer 53 for detecting the north alignment of the HMD 5 and a wired HMD interface 54 for data transmission.

The system furthermore comprises an HMD position detection device 6. It consists substantially of a camera, by means of which the position and alignment of the HMD 5 can be detected. The detected data is transmittable by way of a wired interface 61 for data transmission.

The system furthermore comprises a computer 7 as a calculation unit. The computer 7 is connected to the smartphone 4 by way of a wireless communication link 46 and it is configured to receive alignment data of the smartphone 4 from the smartphone 4. The computer 7 is connected to the HMD position detection device 6 by way of the wired interface 61 and it is configured to receive alignment and position data of the HMD 5 from the latter. The computer 7 is connected to the HMD 5 by way of the wired HMD interface 54 and it is configured to transmit image information to the HMD 5 for the purposes of displaying this on the display 51, and to receive alignment data of the HMD 5.

Figure 6:
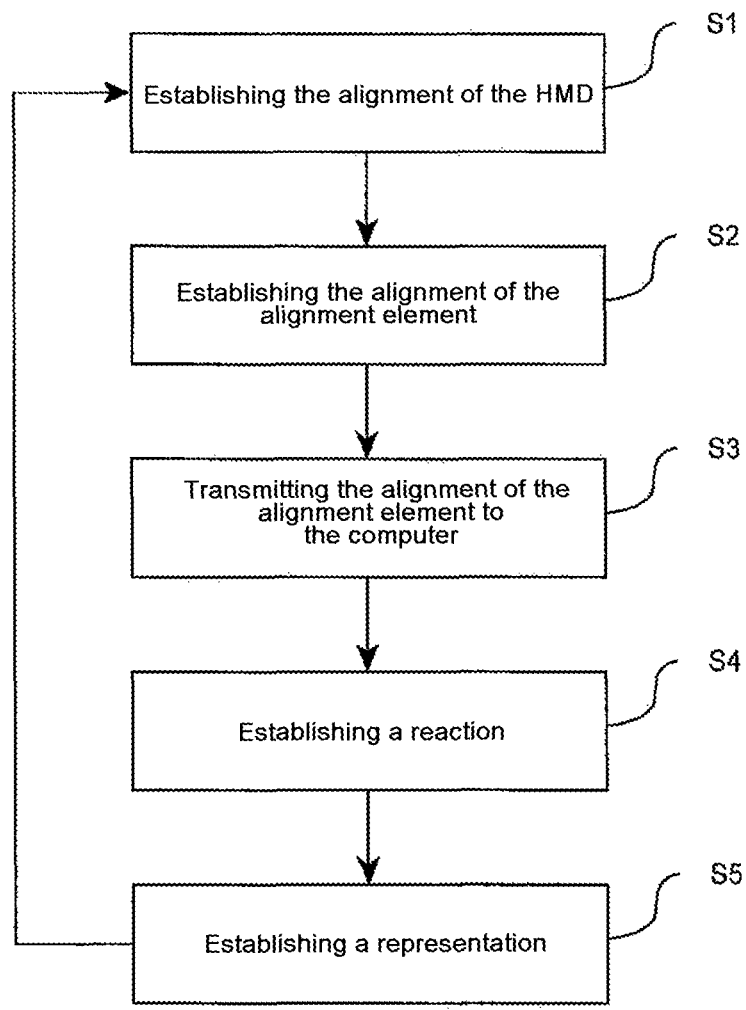
FIG. 6 shows a flowchart of a method according to the invention.

The functionality of the exemplary embodiment is described on the basis of FIG. 6. In a step S1, the alignment of the HMD 5 is established. To this end, the values from the three-axis gyro sensor 52 are read and transmitted to the computer 7 by way of the HMD interface 54. Furthermore, the image information from the HMD position detection device 6 is transmitted to the computer 7 by way of the interface 61. The computer 7 calculates an alignment of the HMD 5 from the received data.

The alignment of the alignment element 2 is established in a step S2. To this end, the smartphone 4 establishes the alignment thereof by way of its three-axis gyro sensor 44. Since the smartphone 4 is arranged in a manner fixed relative to the frame element 27 and therefore arranged in a manner fixed relative to the support device 20, the alignment of the smartphone 4 corresponds to the alignment of the support device 20 and hence to the alignment of a body of a user.

The alignment data of the smartphone 4 are transmitted to the computer 7 in a step S3. To this end, an at least indirect connection to the computer 7 is established via WLAN and the alignment data are transmitted.

In a step S4, the computer 7 establishes a reaction to the alignment of the smartphone 4, for example a control process in a simulation.

In a step S5, the computer 7 establishes an environment representation from the reaction and the alignment of the HMD 5 and transmits the former to the HMD by way of the HMD interface 54 for the purposes of displaying it on the display 51.

In a development of the exemplary embodiment, a wireless handheld controller of a games console 4' is used as sensor unit instead of the smartphone arranged at the frame element 27 level with the bearing connection to the arc element 29. The handheld controller of a games console is a device which is held by one or both hands during operation and which has a plurality of operating elements in the form of finger-operable control buttons and controllers in order to transmit control commands to a gameplay of a game program running on a games console. The handheld controller of a games console furthermore comprises gyroscopic sensors and either it is arranged at one of the two gripper elements 21 or it replaces one or both of the gripper elements 21 in such a way that a user can operate at least some of the operating elements of the handheld controller of a games console and can, where necessary, hold onto the handheld controller of a games console. Like in the exemplary embodiment, the alignment of the sensor unit and hence the alignment of the alignment element 2 is detected by the sensor unit and transmitted to the computer 7. This development of the exemplary embodiment is advantageous in that, in addition to controlling the computer program by the alignment of the alignment element 2, it can also be controlled by means of the operating elements of the handheld controller of a games console. Comparable wireless handheld controllers are also known from the personal computing sector and are usable in the same manner. Within the scope of this description, the term "handheld controller" is used in such a way that it comprises instruments such as handheld controllers of a games console, handheld controllers for a PC, gamepads in general, and the like.

The exemplary embodiment is purely of descriptive nature and does not restrict the subject matter of the patent as defined by the claims. Thus, a person skilled in the art can carry out modifications of the exemplary embodiment without departing from the claimed subject matter. In the exemplary embodiment, the system has the smartphone 4, the computer 7 and the HMD 5, wherein the display for the HMD 5 is established by the computer 7. In the same way, the function of the computer 7 can be assumed directly by the smartphone 4 and the calculated image data can be transmitted directly to the HMD 5. Furthermore, the HMD 5 is used as display unit in the exemplary embodiment. Alternatively, the display unit can be a further smartphone which is fastened to the head of the user by means of a device and which is used like an HMD. In this case, the function of the computer 7 can also be assumed by the second smartphone.

The movement instrument for carrying out movements by displacing the centre of gravity or actuating the muscles of a human body can comprise the following: an alignment element 2 with support device 20 for supporting body parts, wherein the hip region of the body is freely movable, a base 3 for supporting forces on the ground or on a wall, a kinematic device for connecting alignment element 2 and base 3, wherein the kinematic device is adapted to enable a movement of the body about a virtual longitudinal axis and about a virtual transverse axis.

Furthermore, the support device 20 can support the body only at the extremities thereof in the movement instrument 1.

Furthermore, longitudinal axis 11 and transverse axis 12 can form a point of intersection in the movement instrument 1.

Furthermore, the common centre of gravity of body and the alignment element 2, in a rest state, can lie in or under the point of intersection of longitudinal axis and transverse axis in the movement instrument 1.

Furthermore, the base 3 can have a vertical axis which is substantially vertical in the movement instrument 1, wherein the vertical axis intersects a contact plane which subdivides the movement instrument 1 into an upper part and into a lower part, wherein the upper part of the instrument 1 is rotatable in relation to the lower part about the vertical axis, wherein the vertical axis is not identical to the normal of the contact plane, wherein the overall centre of gravity of the instrument 1 can be lifted as a result of a rotation for the purposes of generating a return moment.

Furthermore, a damping element can be provided between the upper and lower part of the instrument 1 in the movement instrument 1.

Furthermore, all elements of the support device 20 can be not movable relative to one another in the movement instrument 1.

Furthermore, the support device 20 for supporting body parts can have two armrests 21 for supporting a forearm of the body in each case and two leg rests 23 for supporting a lower leg of the body in each case in the movement instrument 1.

Furthermore, the support device 20 for supporting body parts can have two strut elements 25 for supporting a sole of the foot in each case in the movement instrument 1.

Furthermore, the support device 20 for supporting body parts can have two gripper elements 21, each of which to be enclosed by one hand, in the movement instrument 1.

Furthermore, each gripper element 21 can be embodied with the associated armrest 22 as a gripper unit 23 in the movement instrument 1, wherein each gripper unit 23 made of armrest 22 and gripper element 20 is displaceable independently of the other gripper unit 23.

Furthermore, the movement instrument 1 can be a position detection device for detecting the current position of each movable part of the device, and a transmission device for transmitting the position data for further-processing to a computer unit.

Furthermore, the movement instrument 1 can have at least one motor or at least one damping element, as a result of which the movement of the alignment element 2 can be influenced, wherein the damping element is adapted to counteract a movement, wherein the motor is adapted to counteract a movement or to assist a movement.

Furthermore, the individual elements of the support device 20 supporting the body can be movable relative to one another in the movement instrument 1.

Furthermore, the movement instrument 1 can have stops for limiting the movement capacity of the movable parts of the instrument, wherein the degrees of freedom of the movement capacity and the stops are adaptable.

Furthermore, the kinematic device can have a support element 29 in the form of a closed circle or of at least a circular arc segment in the movement instrument 1, wherein the support element 29 is adapted to enable the human body to rotate about the longitudinal axis of the instrument.

Disclosed is also a method for carrying out movements with a movement instrument 1, wherein the support device 20 is moved together with the body parts supported thereon by displacing the centre of gravity of the body about the transverse axis and longitudinal axis. In so doing, a control signal can be generated by displacing the gripper unit 23. The method can furthermore comprise the following steps: applying a torque about the vertical axis of the movement instrument 1 by a user, as a result of which a rotation of the upper part of the instrument 1 in relation to the lower part of the instrument 1 is caused, displacing the overall centre of gravity of the instrument upward in the vertical direction, generating a return moment by lifting the overall centre of gravity upward, cancelling the rotation by displacing the overall centre of gravity downward in the vertical direction into the initial position, caused by gravity.

Disclosed is also a system comprising a movement instrument and a visual output device. Here, the visual output device can be video glasses worn on the head of the human body. It is also possible to detect independently of one another and to process further the position of the head and the video glasses worn thereon and the position of the movable parts of the movement instrument 1 for carrying out movements by displacing the centre of gravity or actuating the muscles of a human body. Moreover, the user on the instrument can be at least partly enclosed by the visual output device. Here, the visual output device can be adapted to output stationary or moving images. Furthermore, the visual output device can be adapted to output three-dimensional images.

The sentential connectives . . . "and", "or" and "either . . . or" are used in the meaning based on the logical conjunction, the logical adjunction (often "and/or") or the logical anticoincidence.

What is claimed is:

1. An alignment sensor system, the system comprising:
    a display unit fixable to a head of a user, the display unit displaying an image sequence to the user, the image sequence comprising a first image and a second image;
    a movement instrument for carrying out movements initiated by the user responsive to the first image by displacing a center of gravity or actuating muscles of the user;
    an alignment element provided on the movement instrument;
    a first mass-produced sensor, the first mass-produced sensor being fixed relative to the alignment element;
    a first three-axis gyro sensor the mass-produced sensor comprising the first three-axis gyro sensor, the first three-axis gyro sensor for determining a first alignment information of the mass-produced sensor;
a second three-axis gyro sensor disposed in the display unit, the three-axis gyro sensor for determining a second alignment information corresponding to a second alignment of the display unit;
a computer for receiving and processing the first alignment information and the second alignment information;
wherein the display unit is connected to the computer by an interface,
wherein the computer establishes alignment data for the display unit
   to calculate the image sequence for display on the display unit from the alignment data and the first alignment and
   to transmit the image sequence to the display unit,
wherein the computer calculates the second image from the alignment data and the first alignment responsive to the movements initiated by the user responsive to the first image;
wherein the first mass-produced sensor is a handheld controller for a games console;
wherein the alignment element comprises a gripper element;
wherein the gripper element comprises the handheld controller or the gripper element is the handheld controller.

2. The alignment sensor system of claim 1, wherein the first mass-produced sensor is a portable electronic device, the device comprising a data transmitter, the device being produced by a mass production method and being directed to an end-consumer as buyer.

3. The alignment sensor system of claim 1,
wherein the alignment element comprises a support device, the support device for supporting at least in part the user, and
wherein the first mass-produced sensor is fixed relative to the support device.

4. The alignment sensor system of claim 1, wherein the display unit outputs three-dimensional images.

5. An alignment sensor system method for an alignment sensor system, the alignment sensor system method comprising
   a movement instrument for carrying out movements initiated by a user by displacing a center of gravity or actuating muscles of the user;
   an alignment element provided on the movement instrument;
   a mass-produced sensor, the mass-produced sensor being fixed relative to the alignment element;
   an image output device worn on a head of a user;
   a first three-axis gyro sensor; the mass-produced sensor comprising the first three-axis gyro sensor, the first three-axis gyro sensor for determining a first alignment information of the mass-produced sensor;
   a second three-axis gyro sensor disposed in the image output device, the three-axis gyro sensor for determining a second alignment information corresponding to a second alignment of the image output device;
   a computer for receiving and processing the first alignment information and the second alignment information;
   wherein the first mass-produced sensor is a handheld controller for a games console;
   wherein the alignment element comprises a gripper element;
   wherein the gripper element comprises the handheld controller or the gripper element is the handheld controller;
   the method comprises the steps of:
      displaying a first image by the image output device to the user, the user carrying out movements initiated by the user responsive to the first image;
      establishing an alignment of the mass-produced sensor responsive to the movements initiated by the user responsive to the first image;
      establishing an alignment of the image output device responsive to the movements initiated by the user responsive to the first image;
      determining, by the computer, a second image for the image output device responsive to the alignment of the alignment element and the image output device; and
      transmitting the second image to the image output device.

6. The alignment sensor system method of claim 5,
wherein the mass produced sensor is a portable electronic device with position or alignment sensors and data transmission capability, the mass produced sensor being produced by a mass production method and which is directed to an end-consumer as a buyer, and
wherein the image output device is a pair of video glasses.

7. The alignment sensor system method of claim 6;
detecting a position of the head and the video glasses worn thereon and the position of the alignment element are detected and further processed independently of one another.

* * * * *